UNITED STATES PATENT OFFICE.

LEOPOLD SARASON, OF HIRSCHGARTEN, AND STEPHAN HALLER, OF GRÜNAU, GERMANY; SAID HALLER ASSIGNOR TO SAID SARASON.

PROCESS OF PRODUCING EFFERVESCENT BATHS.

1,041,357.  Specification of Letters Patent.  Patented Oct. 15, 1912.

No Drawing. Application filed October 30, 1906. Serial No. 341,241.

*To all whom it may concern:*

Be it known that we, LEOPOLD SARASON, a resident of Hirschgarten, near Berlin, in the German Empire, and STEPHAN HALLER, a resident of Grünau, near Berlin aforesaid, both subjects of the German Emperor, have invented new and useful Improvements in Processes of Producing Effervescent Baths, of which the following is a specification.

Our invention relates to a process of generating oxygen for effervescing oxygen baths and other purposes.

The process consists in introducing the salts of perboric acid (perborates), and in particular sodium or ammonium perborate, into the bath water and in decomposing the same by the addition of substances which exert a catalytic action. The perborates can be employed alone or mixed with other peroxids, salts or acids.

We are aware that effervescing oxygen baths have already been prepared by dissolving hydrogen peroxid in bath water, and by using substances exerting a catalytic action to liberate the unstable oxygen. The employment of hydrogen peroxid, however, is attended with certain disadvantages:—(1) Hydrogen peroxid is unstable and does not keep well; (2) the hydrogen peroxids of commerce are of great volume, and since for an effervescing oxygen bath about three liters of hydrogen peroxid are necessary, the sale of such voluminous material for single baths is attended with considerable inconvenience; (3) the liberation of the oxygen from hydrogen peroxid is irregular and for bathing purposes is not sufficiently persistent, at first foaming up too vigorously and then rapidly subsiding. These drawbacks are avoided by the employment of perborate, a salt which is extremely rich in oxygen and keeps well. It is true that from the perborate hydrogen peroxid again forms, but this, owing to the difficult solubility of the salt and to its peculiar chemical nature, occurs very gradually. If with perborate a substance which exerts a catalytic action is also present in the bath water, the evolution of oxygen bubbles is not violent and followed by rapid subsidence, but commences gradually and continues unintermittingly and regularly. Thus whereas with the use of hydrogen peroxid a large part of the active oxygen escapes unused, the employment of perborate enables the oxygen bubbles to be more economically utilized for bathing purposes, since they are not evolved with such violence and so more readily find opportunity to settle on the skin of the bather in the form of a layer, and since their evolution occurs over a longer space of time. The reason of this peculiar behavior of perborate is probably to be found in the fact that it dissolves relatively slowly and the entire quantity of hydrogen peroxid latent in it is not disengaged at once, small quantities being continuously evolved, which again are always carried away and decomposed by the action of the the catalyzing substance. Since the employment of perborate results in the evolution of hydrogen peroxid in the nascent state (whereas when hydrogen peroxid is used the oxygen alone acts in the nascent condition), an essentially more effective action is attained for bathing purposes. For as oxygen is not liberated directly, hydrogen peroxid being first evolved, a two-fold action is secured: the action of the nascent peroxid of hydrogen and that of the nascent oxygen. Special experiments have also been conducted with a view to explaining why the effervescence should be so much more prolonged and pronounced when perborate is used, than when hydrogen peroxid is employed, although the actual quantity of oxygen at disposal is the same in the two cases. It would seem that when the material, whether hydrogen peroxid or perborate, is decomposed by the catalyzer the water is first supersaturated with oxygen. In the case of hydrogen peroxid the oxygen remains in the latent condition, whereas the pulverulent, difficultly soluble perborate introduces a large quantity of adhering air into the water, which in accordance with well-known physical laws overcome the condition of equilibrium of the supersaturated solution and cause liberation of the, so to say, "latent" oxygen in the form of bubbles, which exert the beneficial mechanical action on the skin of the bather, and are the condition for the escape of the gas, which is inhaled by the bather. The essentially more pronounced action of nascent hydrogen peroxid compared with that of free hydrogen peroxid is also a point which must by no means be overlooked. Thus Bonjean, for instance, has shown ("Eau Oxygénée à l'État Naissant," *Compt. Rend. de l'Académ*,

*des Scienc.*, vol. 140, p. 51 (2. T), ref. in "*Biochemisches Centralblatt*" 1905, p. 595) that 0.291 gram of hydrogen peroxid is requisite to sterilize a liter of Seine water whereas only 0.060 gram of the same substance in nascent condition is sufficient to effect the sterilization.

The chief action of the baths is that upon the human skin, and this action is not merely that due to the mechanical friction of the effervescing bubbles, but is also an oxidizing, bleaching and mollifying one. This latter action is of especial significance in conjunction with the mechanical one, particularly in diseases of the skin. Thus when instead of hydrogen peroxid perborate is employed, owing to the greater activity of the latter either a relatively smaller quantity thereof will suffice, or the same quantity of hydrogen peroxid latent in the perborate will produce a considerably more vigorous action than it does in free hydrogen peroxid. The perborate can not, it would appear, be replaced with the same advantage by the salts of other peracids. Thus the perchlorates in the presence of catalyzers do not liberate active oxygen in effervescing condition, while the evolution of oxygen by the persulfates and percarbonates is, as experiments prove, too slight and irregular for the present purposes.

To liberate nascent oxygen in effervescent condition any catalyzing substance of inorganic or organic nature may be employed, for instance, iodid of potassium, chlorid of lime, peroxid of manganese, etc.; we have found, however, that difficultly soluble manganese salts in pulverulent form give particularly good results. Manganese borate ($MnB_4O_7$), for instance, is especially suitable as catalyzer in conjunction with perborate. The manganese borate with the perborate is converted into manganese peroxid and boric acid, which latter converts the alkaline metaborate liberated from the perborate into neutral borax.

The manganese peroxid, the actual effective catalytic substance, is produced in very fine molecular form, quite gradually, by the action of the perborate on the manganese borate. In this respect there is a difference from the action of other manganese salts, such for instance as manganese chlorid, which on being brought together with perborate in aqueous solution instantaneously colors the liquid brown owing to the precipitation of coarse flakes of manganese peroxid and causes a violent, rapidly subsiding reaction.

Owing to the very gradual decomposition of the manganese borate, to the molecular nature of the minute particles of manganese peroxid formed from it, and which remain freely suspended and distributed throughout the entire body of bathing water, to the boric acid liberated, which exercises a retarding influence on the decomposition of the peroxid, gradually commencing and then prolonged, regular and intense effervescence is brought about.

By mingling the manganese borate with boric acid the alkaline reacting metaborate forming from the perborate can be further neutralized. An excess of boric acid will tend to still further retard the process of decomposition.

The action of the manganese borate on perborates is a very peculiar one and a dry mixture of the two substances, if damp is carefully avoided, can be kept without decomposition, only liberating oxygen on being moistened. The said reaction, especially in the case of dry mixtures of the two substances, can therefore be utilized not only for the preparation of oxygen baths, but also for other industrial or technical purposes, for instance for the manufacture of powders, tablets and the like, which on being placed in water generate oxygen.

In carrying out our invention we may, for instance, for each liter of water take 1.2 grams sodium perborate, and as catalytic agent 0.06 gram manganese borate, or 0.02 gram manganese sulfate, or 0.05 gram dry blood fibrin.

Instead of the perborate which contains the hydrogen peroxid in latent condition, hydrogen peroxid direct or sodium peroxid can be employed with manganese borate. In this case also the fine molecular precipitation of the manganese dioxid and the reaction-retarding effect of the boric acid is to be observed.

Having thus described our invention, what we claim as new and desire to secure by Letters Patent of the United States is:—

1. The process of generating oxygen gas only for effervescing baths which consist in introducing into water a pulverulent and difficultly soluble perborate having a large quantity of adhering air, in conjunction with a substance exerting a catalytic action.

2. The process of generating oxygen for effervescing baths which consists in introducing into water a perborate in conjunction with a difficultly soluble manganese salt in pulverulent form, and boric acid.

3. The process of generating oxygen, consisting in introducing into water a perborate in conjunction with manganese borate.

4. The process of generating oxygen, consisting in introducing into water a perborate in conjunction with manganese borate and boric acid.

5. The process of generating oxygen for effervescing baths which consists in introducing into water a difficultly soluble manganese salt in pulverulent form and a substance containing oxygen in loosely combined form, upon which the manganese salt exerts a catalytic action to slowly liberate oxygen gas only.

6. The process of generating oxygen which consists in introducing into water manganese borate and a substance containing oxygen in loosely combined form, upon which the manganese borate exerts a catalytic action and which thereupon liberates the said gas.

In testimony whereof we have signed our names to this specification in the presence of two subscribing witnesses.

LEOPOLD SARASON.
STEPHAN HALLER.

Witnesses:
HENRY HASPER,
WOLDEMAR HAUPT.